United States Patent
Bredbeck et al.

(10) Patent No.: US 10,788,151 B2
(45) Date of Patent: Sep. 29, 2020

(54) ROTATABLE AXIALLY SECURING AND PRESSURE-RESISTANT LINE CONNECTION

(71) Applicant: WABCO GmbH, Hannover (DE)

(72) Inventors: Klaus Bredbeck, Landesbergen (DE); Dieter Frank, Hannover (DE); Frank Vogelsang, Nienburg (DE)

(73) Assignee: WABCO GMBH, Hannover (DE)

( * ) Notice: Subject to any disclaimer, the term of this patent is extended or adjusted under 35 U.S.C. 154(b) by 674 days.

(21) Appl. No.: 15/328,065

(22) PCT Filed: May 22, 2015

(86) PCT No.: PCT/EP2015/001049
§ 371 (c)(1),
(2) Date: Jan. 23, 2017

(87) PCT Pub. No.: WO2016/012065
PCT Pub. Date: Jan. 28, 2016

(65) Prior Publication Data
US 2017/0219139 A1    Aug. 3, 2017

(30) Foreign Application Priority Data
Jul. 24, 2014   (DE) .................. 10 2014 010 899

(51) Int. Cl.
*F16L 21/035* (2006.01)
*F16L 27/08* (2006.01)
*F16J 15/06* (2006.01)

(52) U.S. Cl.
CPC ........... *F16L 21/035* (2013.01); *F16J 15/061* (2013.01); *F16J 15/062* (2013.01); *F16L 27/0845* (2013.01)

(58) Field of Classification Search
CPC ....... F16L 58/185; F16L 21/035; F16L 21/03; F16L 27/0845; F16L 27/044;
(Continued)

(56) References Cited

U.S. PATENT DOCUMENTS 2,812,958 A    11/1957 Rogers
5,516,122 A    5/1996  Caffee
(Continued)

FOREIGN PATENT DOCUMENTS

CN    201672202 U    12/2010
CN    202091703 U    12/2011
(Continued)

*Primary Examiner* — Zachary T Dragicevich
*Assistant Examiner* — William S. Choi
(74) *Attorney, Agent, or Firm* — Leydig, Voit & Mayer, Ltd.

(57) ABSTRACT

A connection arrangement includes a first connection body and a second connection body for forming a pneumatic connection along a connection axis, and a sealing element configured to seal a sealing gap which surrounds the pneumatic connection and which has a longitudinal dimension which extends parallel to the connection axis. A pneumatic flow is able to travel through the first and second connection bodies along the connection axis. The first connection body has a through-hole having a cross section transverse to the connection axis. The second connection body is arranged at least partially in the through-hole. An at least partially circumferential first recess transverse to the connection axis is formed on an outer face of the first connection body extending parallel to the connection axis for receiving the sealing element.

17 Claims, 2 Drawing Sheets

(58) Field of Classification Search
CPC ....... F16L 27/0865; F16L 17/06; F16L 21/02; F16L 21/04; F16L 21/05; F16L 37/62; F16L 21/025; F16J 15/062; F25B 31/00
USPC ................. 285/336, 374, 62, 399, 344, 345
See application file for complete search history.

(56) References Cited

U.S. PATENT DOCUMENTS

| | | | |
|---|---|---|---|
| 5,845,944 A | 12/1998 | Enger et al. | |
| 6,286,877 B1 | 9/2001 | Mendoza et al. | |
| 6,499,770 B1 * | 12/2002 | Glista | F16L 27/0808 285/374 |
| 6,676,167 B2 * | 1/2004 | Schroeder | F16L 21/08 285/368 |
| 7,780,201 B2 | 8/2010 | Luzbetak et al. | |
| 2004/0150222 A1 * | 8/2004 | Ichimura | F16L 41/082 285/382 |
| 2009/0236849 A1 * | 9/2009 | Takasaki | F16L 39/005 285/123.15 |

FOREIGN PATENT DOCUMENTS

| | | |
|---|---|---|
| DE | 4216125 A1 | 11/1993 |
| FR | 1473169 A | 3/1967 |
| GB | 543733 A | 3/1942 |
| JP | 53321 A | 1/1978 |
| JP | 0276916 A | 3/1990 |
| JP | 04127460 U | 11/1992 |
| JP | 2013253493 A | 12/2013 |
| NL | 1006313 C2 | 12/1998 |
| WO | WO 03050440 A1 | 6/2003 |

* cited by examiner

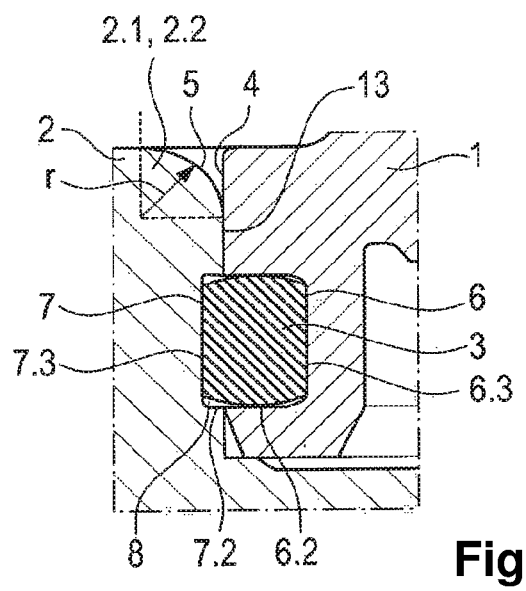
Fig. 2A.)
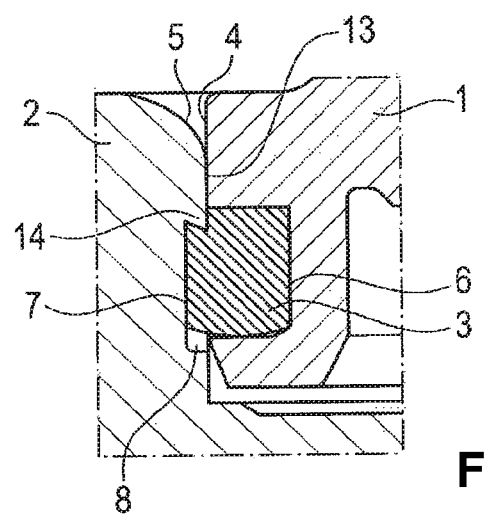
Fig. 2B.)

ROTATABLE AXIALLY SECURING AND PRESSURE-RESISTANT LINE CONNECTION

CROSS REFERENCE TO RELATED APPLICATIONS

This application is a U.S. National Stage Application under 35 U.S.C. § 371 of International application Ser. No. PCT/EP2015/001049 filed on May 22, 2015, and claims benefit to German Patent Application No. DE 10 2014 010 899.6 filed on Jul. 24, 2014. The International Application was published in German on Jan. 28, 2016 as WO 2016/012065 A1 under PCT Article 21(2).

FIELD

The invention relates to a connection arrangement for forming a pneumatic connection, a method for forming a pneumatic connection arrangement, and a vehicle.

BACKGROUND

Seals in the form of so-called O-ring seals serve for sealing gaps between adjacent surfaces, in particular between two bodies. In this case, the seals are arranged in recesses and are installed by pretensioning so that they bear sealingly against two corresponding sealing surfaces of the bodies.

If these seals have to work or act against high pressures from inside or outside, however, there is often the risk that the sealing elements, in particular the O-rings, are forced out of their receivers or recesses and pressed or squashed into the sealing gap between the two bodies. In this case, the sealing element may then be damaged and lose its sealing action. Also, such sealing arrangements become untight with the increasing pressure, since the retaining force between the bodies reduces with increasing pressure and thus the sealing action of the sealing element also becomes reduced.

For example, a sealing arrangement is disclosed in the US printed patent specification U.S. Pat. No. 5,516,122 by which two (connection) bodies are connected pneumatically, a flow being able to travel through said bodies along the connection axis thereof. In the known sealing arrangement, a sealing ring is arranged in two recesses in the two connection bodies and then clamped along the connection axis by means of a sleeve or a clamping ring from the outside by the application of pressure. A self-retaining clamping, in particular an axial latching action, by means of the sealing element is not provided between the two bodies, i.e. without a sleeve or clamping ring.

SUMMARY

In an embodiment, the present invention provides a connection arrangement. The connection arrangement includes a first connection body and a second connection body for forming a pneumatic connection along a connection axis, and a sealing element configured to seal a sealing gap which surrounds the pneumatic connection and which has a longitudinal dimension which extends parallel to the connection axis. A pneumatic flow is able to travel through the first and second connection bodies along the connection axis. The first connection body has a through-hole having a cross section transverse to the connection axis. The second connection body is arranged at least partially in the through-hole. An at least partially circumferential first recess transverse to the connection axis is formed on an outer face of the first connection body extending parallel to the connection axis for receiving the sealing element. An at least partially circumferential second recess transverse to the connection axis is formed on an inner face of the second connection body, extending parallel to the connection axis for receiving the sealing element. The first and second recesses at least partially oppose one another. The sealing element is arranged in at least one portion of a circumferential chamber for the latching connection of the first and second connection bodies. The circumferential chamber is formed by the first and second recesses.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2A and 2B show a partial region (box shown in dashed-dotted lines) of the connection arrangement as shown in FIG. 1.

DETAILED DESCRIPTION

Figure 1:
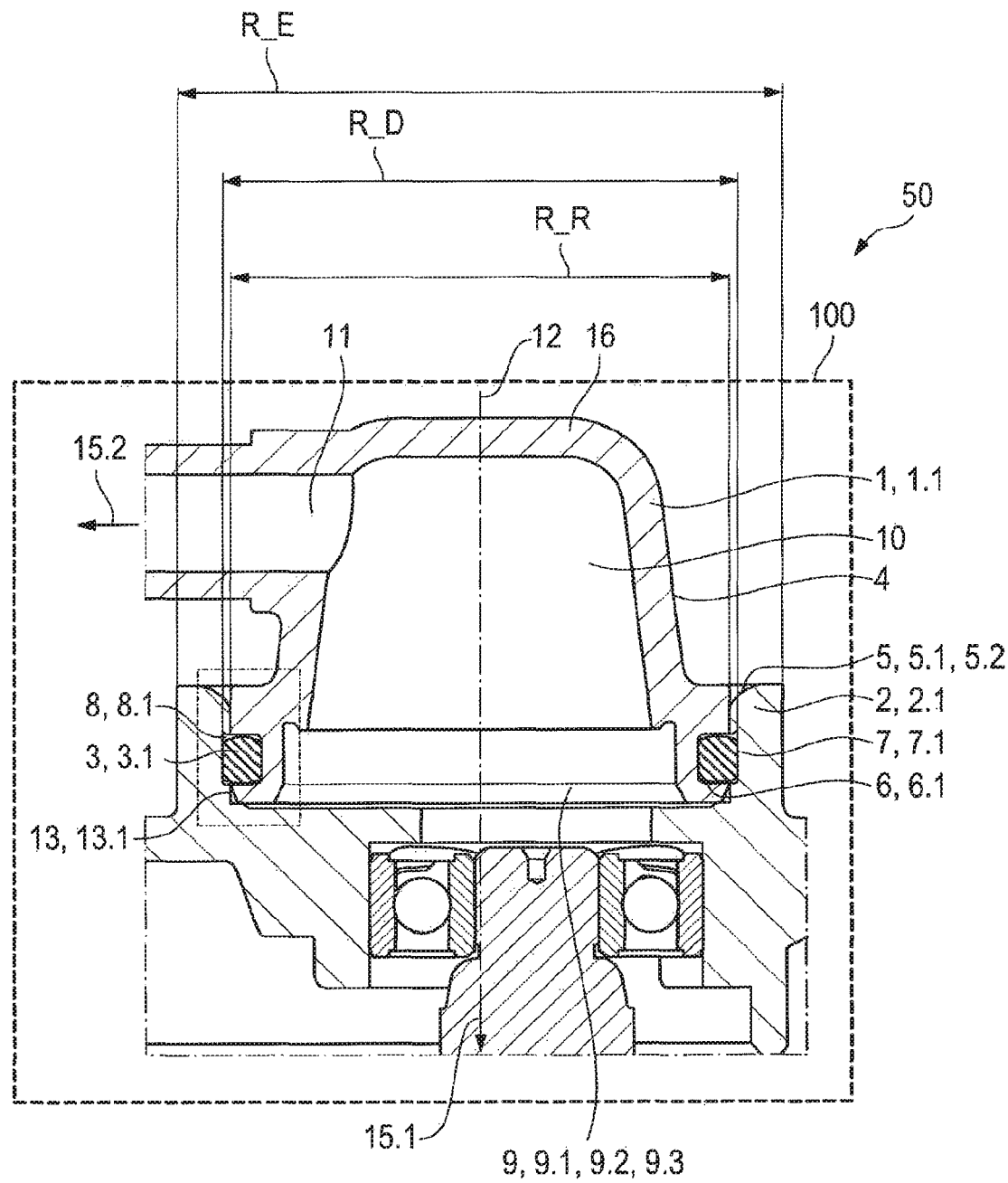
FIG. 1 shows a schematic view of a connection arrangement with a first and second connection body and with a sealing element for forming a pneumatic connection along a connection axis according to an embodiment of the invention.

It would be desirable, to provide a method and a device by which the aforementioned drawbacks are eliminated, in particular for connection arrangements, a flow being able to travel through said connection arrangements along the connection axis thereof. In particular, the provision of a connection arrangement which does not require additional mechanisms for fastening the connection bodies and which has a high sealing and retaining action would be desirable.

An improved connection arrangement and an improved method for forming a connection arrangement are described herein, in particular for where a flow is able to travel through said connection arrangement along the connection axis thereof, by which it is permitted to provide a sealed connection between two bodies which has improved retention and improved sealing action relative to the solutions known from the prior art. In particular, it is described herein to arrange the two bodies such that they are connected pivotably relative to one another, in particular rotatably and sealingly together. A connection arrangement is described herein which, in the case of increasing pressure on the bodies to be connected, has an increasing retaining force between the bodies since in the case of increasing pressure the surface load, and at the same time the requirement for axial fixing force, increases.

A connection arrangement is described herein having a first and second connection body for forming a pneumatic connection along a connection axis and having a sealing element for sealing a sealing gap which surrounds the pneumatic connection and which has a longitudinal dimension which extends parallel to the connection axis, wherein a pneumatic flow is able to travel through the first and second connection bodies along the connection axis, and the first connection body has a through-hole having a cross section transversely to the connection axis. The second connection body is arranged at least partially in the through-hole. An at least partially circumferential first recess transversely to the connection axis is formed on an outer face of the first connection body extending parallel to the connection axis for receiving the sealing element. An at least partially circumferential second recess transversely to the connection axis is formed on an inner face of the second connection body extending parallel to the connection axis for receiving the sealing element. The first and the second recesses at least partially oppose one another. The sealing element is arranged in at least one portion of a circumferential chamber for the latching connection of the first and second connection bodies, wherein the circumferential chamber is formed by the first and second recesses.

A method for forming a connection arrangement along a connection axis is described herein, the connection arrangement having a first and second connection body and having a sealing element for sealing a sealing gap which surrounds the pneumatic connection and which has a longitudinal dimension which extends parallel to the connection axis, wherein a pneumatic flow is able to travel through the first and second connection bodies along the connection axis, and wherein the first connection body has a through-hole having a cross section transversely to the connection axis. An at least partially circumferential first recess transversely to the connection axis is formed on an outer face of the first connection body extending parallel to the connection axis for receiving the sealing element. An at least partially circumferential second recess transversely to the connection axis is formed on an inner face of the second connection body extending parallel to the connection axis for receiving the sealing element. The method comprises the following steps: arranging the sealing element in the at least partially circumferential first recess of the first connection body; inserting the first connection body into the through-hole of the second connection body along the connection axis; deforming, in particular compressing, the sealing element transversely to the connection axis when inserting the first connection body into the through-hole along the connection axis; and expanding, in particular latching, the sealing element transversely to the connection axis into a circumferential chamber which is formed by the at least partially opposing first and second recesses.

Moreover, a vehicle is described herein having a compressor with a through-hole for forming a first connection body; and having a pivotable suction pipe with a dome-like interior and a suction line arranged laterally on an upper face of the dome-like interior for forming a second connection body, which are configured for forming a connection arrangement according to the invention.

According to an embodiment of the invention, a connection arrangement with two connection bodies is provided, in particular a pluggable pneumatic connection with two connection bodies, a pneumatic flow being able to travel along the connection axis thereof, by which the two connection bodies to be connected are connected together in an axially latched manner by means of a sealing element, in particular a resilient sealing element, for example an O-ring. The sealing element in this case exerts a radial and axial retaining force so that the two connection bodies are connected together pneumatically in a sealed manner.

In this case, the sealing element is arranged for sealing a sealing gap between the two connection bodies. The sealing gap to be sealed in this case has a longitudinal dimension which extends parallel to the connection axis. The sealing gap is thus arranged between the two connection bodies in the direction of the connection axis, wherein the connection bodies are partially arranged in one another in an axial manner, in particular inserted into one another. A pneumatic flow is able to flow axially through both connection bodies, i.e. the first and second connection bodies, along the connection axis. Due to pressure fluctuations through the two connection bodies, for example by axial aerating and venting of a pressure system, forces which are able to displace the two connection bodies relative to one another along the connection axis—i.e. axially—act on the connection bodies. By means of the axial retaining force which the sealing element exerts on the two connection bodies—according to the idea of the invention—a latching pneumatic connection is provided which is pneumatically sealed even in changing pressure conditions.

In particular, an embodiment according to the invention provides that recesses are formed in the connection bodies to be connected, said recesses in the mounted state of the connection arrangement opposing one another and thus forming a circumferential chamber for receiving the sealing element. By way of the connection bodies and the sealing element in the recesses, an axially latching connection is provided between the two connection bodies. In this case, an axial retaining force is produced by the proposed latching geometry which sealingly connects the two connection bodies.

Essential advantages of the invention include: a secure retention between the (connection) bodies to be connected, an increased sealing action between the (connection) bodies, the two (connection) bodies are pivotably, in particular rotatably, arranged relative to one another, the retaining force between the (connection) bodies increases with increasing pressure on the (connection) bodies, easy mountability, and damage-free dismantling.

A preferred embodiment provides that a diameter of the through-hole is formed so as to be narrowed in the direction of the second recess transversely to the connection axis, from an insertion diameter which is larger than an external diameter of the sealing element in the inserted state as far as a latching diameter which is smaller than the external diameter of the sealing element in the inserted state. In this preferred embodiment, an insertion contour in the form of a through-hole narrowing in the radial direction is formed for the sealing element, by which it is possible to pretension the sealing element during mounting of the connection arrangement in a gentle manner, without the sealing element being damaged when assembling or interconnecting the connection bodies. In this case, the sealing element is initially deformed, in particular compressed, in the radial direction when the one connection body is inserted into the other connection body, and then expanded—in a latching manner—in the circumferential chamber which is formed by the opposing recess in the two connection bodies.

Preferably, one embodiment provides that the first and second connection bodies are configured to connect a pneumatic pressure source and a pneumatic pressure sink. A pneumatic pressure source, for example, may be a compressor of a vehicle, in particular a compressor driven by a motor. The pneumatic pressure sink is then formed by an air supply line or an air suction port of the compressor, in particular a suction line.

In an expedient embodiment it may be provided that the through-hole in the second connection body is formed as a circular through-hole, in particular as a bore. This embodiment is able to be implemented in a particularly simple manner and permits the two pneumatic connection bodies, namely the first and the second connection bodies, to be arranged rotatably relative to one another when forming the connection arrangement.

A preferred development provides that the sealing element is an O-ring. In this case the sealing elements are standard O-rings which are formed as annular sealing elements and which are then arranged in the circumferential, circular first and second recesses of the first and second connection bodies, in particular in the circumferential chamber, for sealing the sealing gap between the two connection bodies.

In an advantageous embodiment, it may be provided that the inner face of the second connection body in the region of the narrowing diameter approaches tangentially the outer face of the first connection body. In this embodiment, an insertion contour is provided on the first connection body, wherein the inner face of the first connection body, for example, approaches in a circular or parabolic manner the outer face of the second connection body. This embodiment has the advantage that when assembling, interconnecting or mounting the connection arrangement the sealing element, in particular the O-ring, is pretensioned or compressed in a particularly gentle manner, without it being damaged thereby in the form of tears, squashing or other damage to the sealing element and/or the surface of the sealing element.

A preferred development provides that the cross-sectional surface of the second connection body in the region of the narrowing diameter has the shape of a pitch circle with the radius r. In this case, the outer face of the second connection body approaches the outer face of the first connection body on a circular path, i.e. with a circular shape. This embodiment permits a mounting of the connection arrangement which is particularly gentle for the sealing element. When the two connection bodies are combined, the sealing element is continuously and gently compressed or pretensioned by the through-hole in the second connection body, which narrows in a circular manner, and is then expanded abruptly to form a latching connection between the first and second connection bodies as soon as the first and second recesses in the first and second connection bodies oppose one another.

One development may provide that the inner face of the second connection body has a barbed contour, in particular in the region of the through-hole. In this preferred embodiment a barbed contour is formed on the inner face of the second connection body, in particular in the region of the through-hole, said barbed contour ensuring a particularly strong retention between the first and second connection bodies. The barbed contour may be formed, for example, such that the recess on the inner face of the second connection body widens toward the lower end of the recess. In this embodiment, the walls of the second recess in the second connection body are thus arranged obliquely. Such a barbed contour, in particular with the occurrence of high compressive forces or tensile forces on the first and/or second connection body, has the effect of the second connection body digging into the sealing element so that a secure retention between the first and second connection body is formed. This has the further advantage that in the case of increasing compressive or tensile force, the retaining force between the connection bodies is increased. A further possible embodiment of a barbed contour may provide that one or more hooks are formed in the region of the second recess.

Preferably, one embodiment provides that the first connection body is formed by a dome-like interior and a pneumatic connecting connection arranged laterally on an upper face of the dome-like interior. In this case, the first connection body is preferably formed as a suction pipe for a compressor of a vehicle.

A preferred embodiment relates to a connection arrangement in which the sealing element is formed by a resilient or partially resilient material. Different materials are used depending on the embodiment and requirements, for example on the resistance to heat, in particular different types of rubber, perfluoro rubber (FFKM or FFPM), polyethylene (PE) or polytetrafluoroethylene (PTFE). Moreover, it may be provided that the sealing element, in particular the sealing O-ring, has a core made of a metal. In an even further preferred embodiment, the sealing element is formed by a partially resilient material, such as for example thermoplastic elastomers (TPE).

An advantageous embodiment relates to a connection arrangement in which the sealing element has a round cross-sectional surface in a non-deformed state. Other exemplary embodiments for sealing elements may have oval, elliptical or angular, in particular square or rectangular, cross-sectional surfaces.

A particularly advantageous embodiment relates to a connection arrangement in which the first and second recesses are formed as a first and second groove, in particular as a circumferential groove. In this case, the recess is a circumferential elongated angular recess which is formed on the periphery on the outer face and/or inner face of the first and second connection body.

Preferably, one embodiment provides that a first depth dimension transversely to the connection axis of the first recess is larger than a second depth dimension transversely to the connection axis of the second recess. In this case it is provided, in particular, that the recess in the first connection body is deeper than the corresponding recess in the second connection body, so that the sealing element—corresponding to the larger depth dimension—is arranged with a larger (pro)portion in the recess of the first connection body than in the recess of the second connection body. As a result, a secure retention of the sealing element, in particular during the mounting of the sealing arrangement, is ensured so that the sealing element is not able to slip.

A preferred embodiment relates to a connection arrangement in which a first longitudinal dimension parallel to the connection axis of the first recess and a second longitudinal dimension parallel to the connection axis of the second recess in each case is in the region of 2 to 4 mm, preferably in the region of 3 mm in each case. Particularly preferably the recess is designed to be square, i.e. the first longitudinal dimension and the second longitudinal dimension have substantially the same length and also the sum of the depth of the first depth dimension of the first recess and the depth of the second depth dimension of the second recess has substantially the same longitudinal dimension as the first and second longitudinal dimension, in particular in the region of 3 mm.

In an expedient embodiment it may be provided that the sealing element has a Shore hardness of between 50 to 60 Shore, preferably of 55 Shore. In the Shore hardness scale a high value means a high degree of hardness.

A preferred development provides that the first connection body is a suction pipe and the second connection body is a compressor of a vehicle. In this embodiment the connection arrangement is arranged in a vehicle, in particular a passenger motor vehicle, wherein air is suctioned and/or vented via the suction pipe. In this case pressures of up to 3 bar prevail temporarily. Also, the suctioning results in slight negative pressures. In the case of such pressures the connection arrangement also has to be permanently sealed, since otherwise unfiltered air, in particular moist air, during the suctioning penetrates the pneumatic system and leads to wear and/or other damage to the pneumatic system.

FIG. 1 shows a schematic view of a preferred embodiment of a connection arrangement 50 for forming a pneumatic connection between a pneumatic pressure source 14 and a pneumatic pressure sink 15, for example between a compressor 2.1 and a pivotable suction pipe 1.1 of a vehicle 100 (indicated schematically).

The present connection arrangement comprises a first and second connection body 1, 2 as well as a sealing element 3 which is arranged between the first and second connection body 1, 2. The first and second connection bodies 1, 2 form a pneumatic connection along a connection axis 12. The sealing element 3, in particular an O-ring, is provided for the sealing and connection, in particular for the sealed connection of the sealing gap 13 which extends parallel to the connection axis 12 between the first and a second connection body 1, 2.

A pneumatic flow is able to travel through the first and second connection bodies 1, 2 along the connection axis 12, wherein the second connection body 2 comprises a through-hole 9, in particular a circular through-hole 9.2 or a bore 9.3, along the connection axis 12. For forming the pneumatic connection the first connection body 1 is at least partially arranged, in particular with a shaft, in the through-hole 9 of the second connection body 2.

On an outer face 4 of the first connection body 1 which extends parallel to the connection axis 12, a circumferential first recess 6, in particular a first circumferential first groove 6.1, is formed transversely to the connection axis. The sealing element 3, in particular the O-ring, is received in the circumferential first recess 6, in particular in the first circumferential groove 6.1. The sealing element 3 in this case has in the inserted state an external diameter of R_D.

On a circumferential inner face 5 of the second connection body 2 parallel to the connection axis 12, a corresponding circumferential second recess 7, in particular a second circumferential groove 7.1, is provided transversely to the connection axis 12, said second recess also serving for receiving the sealing element 3, in particular the O-ring.

The through-hole 9 in the second connection body 2, in particular the bore 9.3 along the connection axis 12 in the second connection body 2, has a diameter 5.2 transversely to the connection axis 12 which narrows in the direction of the second recess 7. The narrowing diameter 5.2 of the through-hole 9 forms an insertion contour or insertion aid, for the mounting or assembly of the connection arrangement. During the mounting or assembly of the connection arrangement, in particular when inserting the first connection body 1 into the through-hole 9 of the second connection body 2 for forming a sealed pneumatic connection, the sealing element—arranged in the recess 6 of the first connection body 1—is gently compressed and then expanded abruptly to form a latching connection between the first and second connection body 1, 2 when the first and second recess 6, 7 oppose one another.

The diameter 5.1 of the through-hole 9 in the present case at its largest width is formed with an insertion diameter R_E, which reduces in the direction of the second recess 7 as far as a latching diameter R_R. The insertion diameter R_E is in this case larger than the external diameter R_D of the sealing element 3 in the inserted state and the latching diameter R_R is smaller than the external diameter R_D of the sealing element 3 in the inserted state.

In the connection arrangement shown, the first recess 6 in the first connection body 1 and the second recess 7 in the second connection body 2 oppose one another and form a circumferential chamber 8 in which the sealing element 3 is arranged for the latching connection between the first and second connection bodies 1, 2.

FIG. 2 shows a schematic view of a partial region (box shown in dashed-dotted lines) of the embodiment of a connection arrangement as shown and described in FIG. 1, where two different states or situations are shown, namely on the one hand a connection arrangement where no forces act on the connection bodies 1 and 2 (see A) in FIG. 2) and on the other hand a connection arrangement where forces act on the connection bodies (see B) in FIG. 2).

FIG. 2A) shows the state or the situation in which the first and second connection bodies 1, 2 together with the sealing element 3 form a connection arrangement, wherein no forces act on the first or second connection body along the connection axis 12.

Also shown is a partial region of the narrowing through-hole 9 in the second connection body 2, in particular the bore along the connection axis 12. The narrowing through-hole 9, in particular the edge of the through-hole 9, forms an insertion contour for the first connection body 1, in particular the sealing element 3 in the recess 6 in the first connection body 1, wherein the second connection body 2 comprises a cross section which narrows toward the second recess 7, and the cross-sectional surface 2.1 has the shape of a pitch circle 2.3 with a radius r. Without limiting the invention, parabolic cross-sectional surfaces or cross-sectional surfaces which approach the outer face of the first connection body 1 in a tangential manner are also provided. A round or parabolic cross-sectional surface simplifies the joining/mounting of the connection arrangement, wherein when inserting the first connection body 1 into the through-hole 9 of the second connection body 2 along the connection axis 12, the sealing element 3 is gently deformed, in particular is compressed transversely to the connection axis 12, and is then expanded into the second recess 7 of the second connection body 2 and thus a latching connection is formed.

In the connection arrangement shown, a first depth dimension 6.2 transversely to the connection axis 12 of the first recess 6 in the first connection body 1 is larger than a second depth dimension 7.2 transversely to the connection axis 12 of the second recess 7 in the second connection body 2. The first and second recesses 6, 7 have a first longitudinal dimension 6.3 parallel to the connection axis 12 of the first recess 6 and a second longitudinal dimension 7.3 parallel to the connection axis 12 of the second recess, which in each case is in the region of 2 to 4 mm, in particular in the region of 3 mm. Particularly preferably, the sum of the depth of the first depth dimension 6.2 and the depth of the second depth dimension 7.2 is substantially the same as the length of the first longitudinal dimension 6.3 and/or the second longitudinal dimension 7.3 and is in the region of 2 to 4 mm, in particular in the region of 3 mm. Thus, overall this results in a substantially square cross-sectional surface of the entire seal receiver consisting of the first recess 6 and the second recess 7 for the receiving of the sealing element 3, in particular in the form of an O-ring. 3.1

In FIG. 2B) a state or situation is shown in which the first and second connection bodies 1, 2 together with the sealing element 3 once again form a connection arrangement, wherein this time, however, a compressive force or tensile force along the connection axis 12 acts on the first and/or on the second connection body 1, 2. By means of this force the first and second connection bodies are displaced relative to one another and deform the sealing element 3, wherein the latching connection between the first and the second connection bodies 1, 2 is not released.

In a preferred embodiment of the connection arrangement a barbed contour 14 is formed on the inner face 5 of the second connection body 2, in particular in the region of the through-hole 9, said barbed contour serving for a particularly strong retention between the first and second connection body 1, 2. The barbed contour 14 in the present case is formed such that the recess on the inner face of the second connection body 2 widens toward the lower end of the second recess 7. In this embodiment the walls (transversely to the connection axis 12) of the second recess 7 in the second connection body 2 are formed obliquely outwardly so that the edge of the recess 7 forms a barb or a barbed contour 14. The result of the barbed contour 14, in particular with the occurrence of high compressive or tensile forces on the first and/or second connection body 1, 2, is that the second connection body 2 digs into the sealing element 3 so that a secure retention between the first and second connection bodies 1, 2 is formed. This has the advantage, amongst other things, that with increasing compressive or tensile force, the retaining force between the connection bodies is increased. A further possible embodiment of a barbed contour, however, may also be implemented in the form of one or more hooks which are formed in the region of the second recess.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 First connection body
1.1 Suction pipe
2 Second connection body
2.1 Compressor
2.2 Cross-sectional surface
2.3 Pitch circle
3 Sealing element
3.1 O-Ring
4 Outer face of first connection body 1
5 Inner face of second connection body 2
5.1 Region of narrowing diameter 5.2
5.2 Diameter
6 First recess in first connection body 1
6.1 First groove
6.2 First depth dimension of first recess
6.3 First longitudinal dimension of first recess
7 Second recess in second connection body 2
7.1 Second groove
7.2 Second depth dimension of second recess
7.3 Second longitudinal dimension of second recess
8 Circumferential chamber
8.1 Portion of circumferential chamber
9 Through-hole in second connection body 2
9.1 Cross section of through-hole
9.2 Circular through-hole
9.3 Bore
10 Dome-like interior
11 Pneumatic connection end
12 Connection axis
13 Sealing gap
14 Barbed contour
15.1 Pressure source
15.2 Pressure sink
16 Upper face of dome-like interior
50 Connection arrangement
100 Vehicle
r Radius
R_E Insertion diameter
R_D External diameter of sealing element 3
R_R Latching diameter

The invention claimed is:

1. A connection arrangement comprising:
a first connection body and a second connection body for forming a pneumatic connection along a connection axis;
a sealing element configured to seal a sealing gap which surrounds the pneumatic connection and which has a longitudinal dimension which extends parallel to the connection axis,
wherein a pneumatic flow is able to travel through the first and second connection bodies along the connection axis,
wherein the second connection body has a through-hole having a cross section transverse to the connection axis,
wherein the first connection body is arranged at least partially in the through-hole;
wherein, on an outer face of the first connection body extending parallel to the connection axis, an at least partially circumferential first recess is formed, the at least partially circumferential first recess being configured to receive a portion of the sealing element;
wherein, on an inner face of the second connection body extending parallel to the connection axis, an at least partially circumferential second recess is formed, the at least partially circumferential second recess being configured to receive a portion of the sealing element;
wherein the first and second recesses at least partially oppose one another;
wherein the sealing element is arranged in at least a portion of a circumferential chamber for a latching connection of the first and second connection bodies,
wherein the circumferential chamber is formed by the first and second recesses,
wherein the first connection body is a suction pipe and the second connection body is a compressor of a vehicle.

2. The connection arrangement as claimed in claim 1, wherein a diameter of the through-hole narrows, along the connection axis, from an insertion diameter, which is larger than an external diameter of the sealing element in an inserted state, to a latching diameter, which is smaller than an external diameter of the sealing element in the inserted state.

3. The connection arrangement as claimed in claim 1, wherein the first and second connection bodies are configured to connect a pneumatic pressure source and a pneumatic pressure sink.

4. The connection arrangement as claimed in claim 1, wherein the through-hole is formed as a circular through-hole bore.

5. The connection arrangement as claimed in claim 1, wherein the sealing element is an O-ring.

6. The connection arrangement as claimed in claim 2, wherein the inner face of the second connection body extending parallel to the connection axis curves, in a region of the narrowing diameter, towards the outer face of the first connection body.

7. The connection arrangement as claimed in claim 6, wherein a portion of a cross-section of the second connection body in the region of the narrowing diameter forms a circular arc having a radius.

8. The connection arrangement as claimed in claim 1, wherein the inner face of the second connection body in the region of the through-hole has a barbed contour.

9. The connection arrangement as claimed in claim 1, wherein the first connection body is formed by a dome-like interior and a pneumatic connection end arranged laterally on an upper face of the dome-like interior.

10. The connection arrangement as claimed in claim 1, wherein the sealing element is formed by a resilient or partially resilient material.

11. The connection arrangement as claimed in claim 1, wherein the sealing element in a non-deformed state has a round cross-sectional surface.

12. The connection arrangement as claimed in claim 1, wherein the first and second recesses are formed as a first and a second circumferential groove.

13. The connection arrangement as claimed in claim 1, wherein a first depth of the first recess in a direction transverse to the connection axis is larger than a second depth of the second recess in a direction transverse to the connection axis.

14. The connection arrangement as claimed in claim 1, wherein a first longitudinal dimension parallel to the connection axis of the first recess and a second longitudinal dimension parallel to the connection axis of the second recess in each case is in the region of 2 to 4 mm.

15. The connection arrangement as claimed in claim 1, wherein the at least partially circumferential first recess is a first groove,
wherein the at least partially circumferential second recess is a second groove,
wherein the first groove extends, in a direction perpendicular to the connection axis, into the first connection body from the outer face of the first connection body extending parallel to the connection axis,
wherein an extent of the first groove, in a direction parallel to the connection axis, is limited by a first plane perpendicular to the connection axis and a second plane perpendicular to the connection axis,
wherein the second groove extends, in a direction perpendicular to the connection axis, into the second connection body from the inner face of the second connection body extending parallel to the connection axis, and
wherein an extent of the second groove, in a direction parallel to the connection axis, is limited by the first plane and the second plane.

16. The connection arrangement as claimed in claim 15, wherein the circumferential chamber and the sealing element arranged in the at least one portion of the circumferential chamber extend, in a direction parallel to the connection axis, from the first plane to the second plane.

17. A vehicle, comprising a connection arrangement as claimed in claim 1.

* * * * *